United States Patent [19]

Rinkewich

[11] Patent Number: 5,066,031
[45] Date of Patent: Nov. 19, 1991

[54] SELF-PROPELLED VEHICLE

[76] Inventor: Isaac Rinkewich, 48-22 Garden View Ter., Hightstown, N.J. 08520

[21] Appl. No.: 528,398

[22] Filed: May 25, 1990

[51] Int. Cl.$^5$ .............................................. B62M 1/04
[52] U.S. Cl. .................................... 280/221; 272/114; 280/258
[58] Field of Search .............. 280/221, 220, 214, 215, 280/251, 255, 258; 272/73, 114

[56] References Cited

U.S. PATENT DOCUMENTS

| | | | |
|---|---|---|---|
| 1,440,372 | 1/1923 | Brown et al. | 280/221 |
| 1,571,562 | 2/1926 | Tingley | 280/221 |
| 2,062,830 | 12/1936 | Sabaeff | 280/221 |
| 4,779,863 | 10/1988 | Yang | 280/221 |
| 4,846,488 | 7/1989 | Szadkowski | 280/221 |

Primary Examiner—Mitchell J. Hill
Attorney, Agent, or Firm—Benjamin J. Barish

[57] ABSTRACT

A self-propelled vehicle includes a pair of foot treadles mounted in side-by-side relation, and an overrunning clutch for each foot treadle. Each foot treadle is mounted to the frame by a four-link parallelogram retaining the respective foot treadle substantially parallel to the longitudinal axis of the vehicle frame as the foot treadle is driven downwardly by the operator's foot and is returned upwardly by springs.

8 Claims, 2 Drawing Sheets

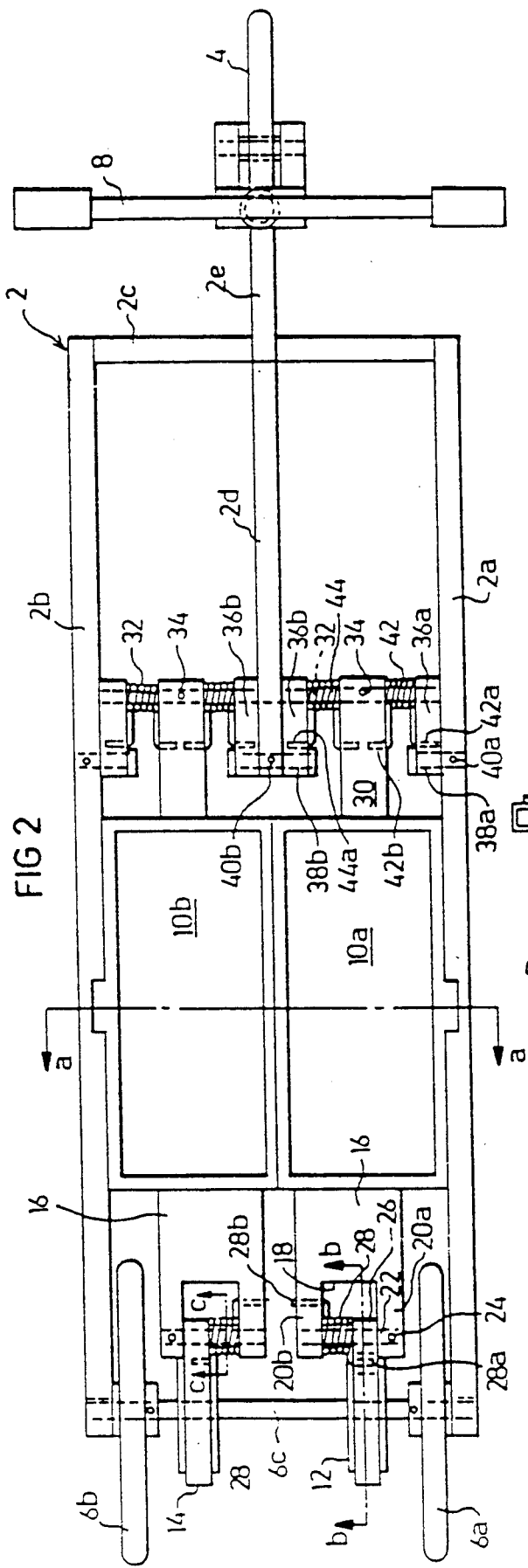

SELF-PROPELLED VEHICLE

BACKGROUND OF THE INVENTION

The present invention relates to self-propelled vehicles, and particularly to vehicles which are propelled by the operator s foot. The invention is especially useful for three-wheel foot-operated scooters, and is therefore described below with respect to this application, but it will be appreciated that the invention could advantageously be used in other applications as well.

A number of self-propelled scooters have been constructed, as illustrated for example in U.S. Pat. Nos. 1,237,969, 1,440,372, 1,529,952, 1,571,562, 2,062,830, 2,723,131, 3,175,844, 3,180,656, 3,992,029 and 4,124,222. Such known scooters generally include one or two foot treadles pivotally mounted to the frame and coupled to the rear wheel(s) of the vehicle by a chain-and-sprocket or rack-and-pinion transmission including an overrunning clutch such that depression of the foot treadle(s) rotates the rear wheel(s) to propel the scooter.

OBJECTS AND SUMMARY OF THE PRESENT INVENTION

An object of the present invention is to provide a self-propelled vehicle having a number of advantages, as will be described more particularly below, over the conventional constructions as illustrated by the above-cited patents.

According to the present invention, there is provided a self-propelled vehicle, comprising a frame having a wheel at one end, and a pair of wheels at the opposite end connected for rotation together by a common axle; a pair of foot treadles mounted in side-by-side relation; and an overrunning clutch for each of the foot treadles. Each overrunning clutch has a driving member coupled to the foot treadle, and a driven member coupled to the common axle of the pair of wheels for driving the vehicle. Each of the treadles is mounted to the frame by a four-link parallelogram having first and second arms at the opposite ends of the respective foot treadle for retaing the respective foot treadle substantially parallel to the longitudinal axis of the vehicle frame as the foot treadle is driven downwardly by the operator's foot to propel the vehicle.

A self-propelled vehicle constructed in accordance with the foregoing features provides a number of important advantages. Thus, since the foot treadle is retained substantially parallel to the longitudinal axis of the vehicle frame in all its movements, the operator may propel the vehicle by merely shifting the operator's weight from one foot to the other, thereby producing a maximum propelling force with a minimum of effort and awkwardness in body movements. Moreover, the natural posture of the operator while propelling the vehicle, as well as while coasting, contributes both to the comfort and safety of the operator. The foregoing advantages are particularly significant by the two-treadle construction.

Further features and advantages of the invention will be apparent from the description below.

BRIEF DESCRIPTION OF THE DRAWINGS

The invention is herein described, by way of example only, with reference to the accompanying drawings, wherein:

FIG. 2 is a top plan view of the vehicle of FIG. 1; and

FIGS. 2a, 2b and 2c are sectional views along lines A—A, B—B, and C—C, respectively, of FIG. 2.

DESCRIPTION OF A PREFERRED EMBODIMENT

Figure 1:
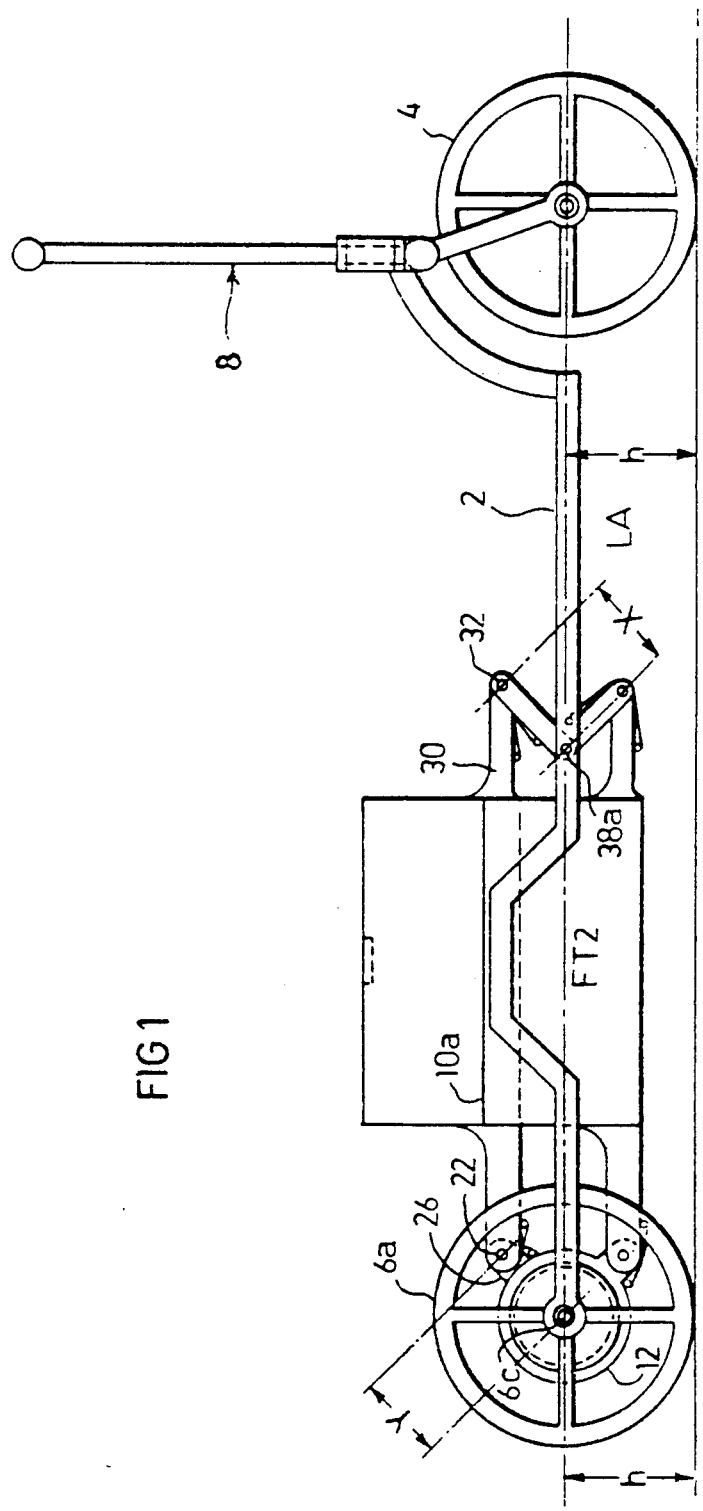
FIG. 1 is a side elevational view illustrating one form of self-propelled vehicle constructed in accordance with the present invention.

The vehicle illustrated in the drawings is a three-wheel scooter having a frame, generally designated 2, a single front wheel 4, and a pair of rear wheels 6a, 6b. The frame 2 includes two longitudinally-extending bars 2a, 2b on its opposite sides joined at the front side by a transversely-extending bar 2c. The two rear wheels 6a, 6b are connected for rotation together by a rear axle 6c journalled between the two frame bars 2a, 2b. Disposed between the two longitudinally-extending bars 2a, 2b is an intermediate bar 2d, which is joined at its front end to an upwardly-curved bar 2e carrying the front wheel 4, and the steering mechanism generally designated 8. All the foregoing parts of the scooter may be of known construction, and therefore further details are not set forth herein.

The scooter illustrated in the drawings further includes two foot treadles 10a, 10b, in side-by-side relation. Each foot treadle 10a, 10b is coupled to the rear axle 6c of the two rear wheels 6a, 6b by an overrunning clutch 12, 14 such that depressing each foot treadle drives the rear wheels to propel the vehicle.

Each foot treadle 10a, 10b is part of a four-link parallelogram mechanism which maintains the respective foot treadle in a substantially horizontal position, i.e., substantially parallel to the longitudinal axis LA of the vehicle frame, as the foot treadle is driven downwardly by the operator's foot to propel the vehicle. The depression of foot treadle 10a transfers power to the rear axle 6c of the two rear wheels 6a, 6b via overrunning clutch 12; and depression of foot treadle 10b transfers power to the rear axle 6c via overrunning clutch 14. Both foot treadles 10a, 10b are mounted in the same manner to the frame 2, and operate in the same manner via their respective clutches 12, 14, to transfer the power to the rear wheels 6a, 6b, such that the following description of the mounting and operation of foot treadle 10a via its clutch 12 will also explain the mounting and operation of foot treadle 10b via its clutch 14.

Foot treadle 10a carries, at its rear end, an extension 16 which is formed with a rectangular slot 18 opening to its rear edge to define two bifurcations 20a, 20b. The outer ends of the two bifurcations are formed with bores receiving a pin 22 extending across slot 18 and fixed to extension 16 by a fastener 24.

An arm 26 (FIG. 2b) is pivotally mounted on pin 22. The opposite end of arm 26 is integrally formed with a ring 12a, which constitutes the outer, driving member of clutch 12. The inner, driven member of clutch 12, shown at 12b in FIG. 2, is of cylindrical configuration, having an outer diameter substantially equal to the inner diameter of ring 12a. Clutch member 12b is formed on its outer surface with a plurality of wedge-shaped notches 12c, each receiving a roller member 12d. The construction is such that when the outer driving member 12a is rotated in a clockwise direction (FIG. 2b), the roller members 12d become wedged between the two clutch members 12a, 12b to couple the driven member 12b to the driving member 12a; whereas when the outer clutch member 12a moves in the opposite direction (counterclockwise, FIG. 2b), the roller members 12b release the driven member 12b from the clutch member 12a.

The driven clutch member 12b is fixed to the rear axle 6c. Thus, the rear wheels 6a, 6b will be coupled to the driving clutch member 12a during its downward movement (i.e., clockwise direction, FIG. 2b), but will be uncoupled from the driving clutch member 12a in the upward movement of the that member (i.e., counterclockwise direction, FIG. 2b).

The clockwise movement of arm 26 on pin 22 is resisted by a coil spring 28 received on pin 22. One end 28a of spring 28 underlies arm 26 (as shown in FIG. 2b). The other end 28b of the spring engages bifurcation 20b of the foot treadle extension 16.

Foot treadle 10a also includes an extension 30 at its front end. Extension 30 is formed with a bore receiving a pin 32 fixed to the extension by a fastener 34. Pin 32 projects from the opposite sides of the front extension 30 and its opposite ends pivotally mount one end of two arms 36a, 36b. The opposite ends of the two arms 36a, 36b are pivotally mounted to the two frame bars 2a, 2b, respectively, by means of pivot pins 38a, 38b, fixed to their respective frame bars by fasteners 40a, 40b.

The opposite ends of pivot pin 32 also carry coil springs 42, 44. One of the ends 42a, 44a, of the two coil springs engage their respective arms 36a, 36b. The opposite ends of the coil springs engage the front extension 30 of foot treadle 10a.

As seen in FIG. 1, the effective length of the two arms 36a (and also 36b) at the front end of the foot treadle 10a (indicated by dimension "X", namely the distance between the two pivotal mountings 32, 38a of arm 36a) is equal to the effective length of arm 26 at the rear end of the foot treadle 10a (i.e., dimension "Y" in FIG. 1, namely the distance between the axis of pivot pin 22 and the rear axle 6c). As also seen in FIG. 1, the distance "H" (namely the radius of the rear wheel 6a) is equal to the distance "h" (namely the distance between the ground and the axis of pivot pin 38a and 38b). Accordingly, arm 26 constituting a first arm at one end of the foot treadle 10a, and arms 36a, 36b constitutes second arm at the opposite end of the foot treadle, form which arm a four-link parallelogram in which the remaining two links are the foot treadle 10a and the vehicle frame 2, particularly the line passing through the rear axle 6c and the axis of pivot pin 38a, which line is parallel to the longitudinal axis of the vehicle frame.

The above four-link parallelogram mechanism will permit foot treadle 10a to move downwardly under the weight of the operator's foot, and to move upwardly by springs 42, 44 at the front end of the foot treadle, and also by springs 28 at the rear end of the foot treadle. During both the downward and upward movements of foot treadle 10a, the above four-link parallelogram mechanism will retain the foot treadle in a substantially horizontal position, i.e., substantially parallel to the longitudinal axis of the vehicle frame.

As described earlier, foot treadle 10b is mounted to the frame, and cooperates with its clutch 14, in the same manner as described above with respect to foot treadle 10a. Thus, its four-link parallelogram mechanism will also retain foot treadle 10b horizontal when the foot treadle is depressed to apply a rotary force to the rear axle 6c to propel the vehicle forwardly, and when it is returned by its respective springs at the front and rear ends of the foot treadle while decoupled from the rear axle.

Accordingly, the operator may easily propel the scooter by merely shifting his weight from one foot to the other, and may coast by keeping his weight distributed between both foot treadles.

While the invention has been described with respect to one preferred embodiment, it will be appreciated that this is set forth merely for purposes of example, and that many variations, modifications and other applications of the invention may be made.

What is claimed is:

1. A self-propelled vehicle, comprising:
   a frame having a wheel at one end, and a pair of wheels at the opposite end connected for rotation together by a common axle;
   a pair of foot treadles mounted in side-by-side relation; and
   an overrunning clutch for each of said foot treadles, each overrunning clutch having a driving member coupled to said foot treadle, and a driven member coupled to said common axle of said pair of wheels for driving the vehicle;
   each of said treadles being mounted to the frame by a four-link parallelogram having first and second arms at the opposite ends of the respective foot treadle for retaining the respective foot treadle substantially parallel to the longitudinal axis of the vehicle frame as the foot treadle is driven downwardly by the operator's foot to propel the vehicle.

2. The vehicle according to claim 1, further including spring means for returning the foot treadles to their upper positions after having been driven downwardly by the operator's foot.

3. The vehicle according to claim 2, wherein each foot treadle includes a front end and a rear end, and wherein said spring means includes a spring between the front end of each foot treadle and the second arm of the respective parallelogram.

4. The vehicle according to claim 3, wherein each of said parallelograms includes a pair of said second arms disposed on opposite sides of an extension formed at the front end of the respective foot treadle, said spring means for each foot treadle including a spring between the extension of the respective foot treadle and each of said second arms for the respective foot treadle such that the latter springs are loaded when the respective foot treadle is driven downwardly by the operator's foot.

5. The vehicle according to claim 4, wherein said spring means for each foot treadle further includes a spring between the rear end of the respective foot treadle and its respective first arm, which latter spring is also loaded when the respective foot treadle is driven downwardly by the operator's foot.

6. The vehicle according to claim 5, wherein the rear end of each foot treadle is formed with a bifurcated extension pivotally mounting said first arm of the respective four-link parallelogram.

7. The vehicle according to claim 1, wherein said driving member of each of the overrunning clutches is integrally formed with the first arm of the respective four-link parallelogram, the driven member of each of the overrunning clutches being coupled to its respective driving member by a plurality of rolling elements received within sockets formed in the respective driven member.

8. The vehicle according to claim 1, wherein the vehicle includes a single wheel at its front end, and said pair of wheels fixed to said common axle at its rear end; the driven members of the two overrunning clutches being fixed to said common axle at the rear end.

* * * * *